(12) United States Patent
Vosler

(10) Patent No.: US 7,937,782 B2
(45) Date of Patent: May 10, 2011

(54) WATER SAVING DEVICE FOR A TOILET

(76) Inventor: Darby J. Vosler, Miles City, MT (US)

( * ) Notice: Subject to any disclaimer, the term of this patent is extended or adjusted under 35 U.S.C. 154(b) by 422 days.

(21) Appl. No.: 12/148,032

(22) Filed: Apr. 16, 2008

(65) Prior Publication Data
US 2009/0260144 A1    Oct. 22, 2009

(51) Int. Cl.
*E03D 1/14* (2006.01)
(52) U.S. Cl. .................................. 4/324; 4/395; 4/404
(58) Field of Classification Search .............. 4/324, 325, 4/391, 392, 393, 403, 404, 395
See application file for complete search history.

(56) References Cited

U.S. PATENT DOCUMENTS

| 2,602,934 | A | * | 7/1952 | McCormack et al. | 4/324 |
| 2,666,929 | A | * | 1/1954 | Schnepp | 4/392 |
| 2,835,900 | A | * | 5/1958 | Gleason | 4/324 |
| 2,895,141 | A | * | 7/1959 | Curran | 384/27 |
| 3,996,629 | A | * | 12/1976 | Riedel | 4/324 |
| 5,515,553 | A | * | 5/1996 | Charriere et al. | 4/325 |

* cited by examiner

*Primary Examiner* — Gregory Huson
*Assistant Examiner* — Janie Christiansen
(74) *Attorney, Agent, or Firm* — Dennis L. Thomte; Thomte Patent Law Office LLC

(57) ABSTRACT

A water saving device for a flush toilet comprising a flapper valve limit structure which yieldably limits the upward movement of a toilet tank flapper valve after it has been moved upwardly from its lower closed position towards its upper position thereby reducing the amount of water which will be discharged from the water tank into the toilet bowl during a flushing cycle.

1 Claim, 4 Drawing Sheets

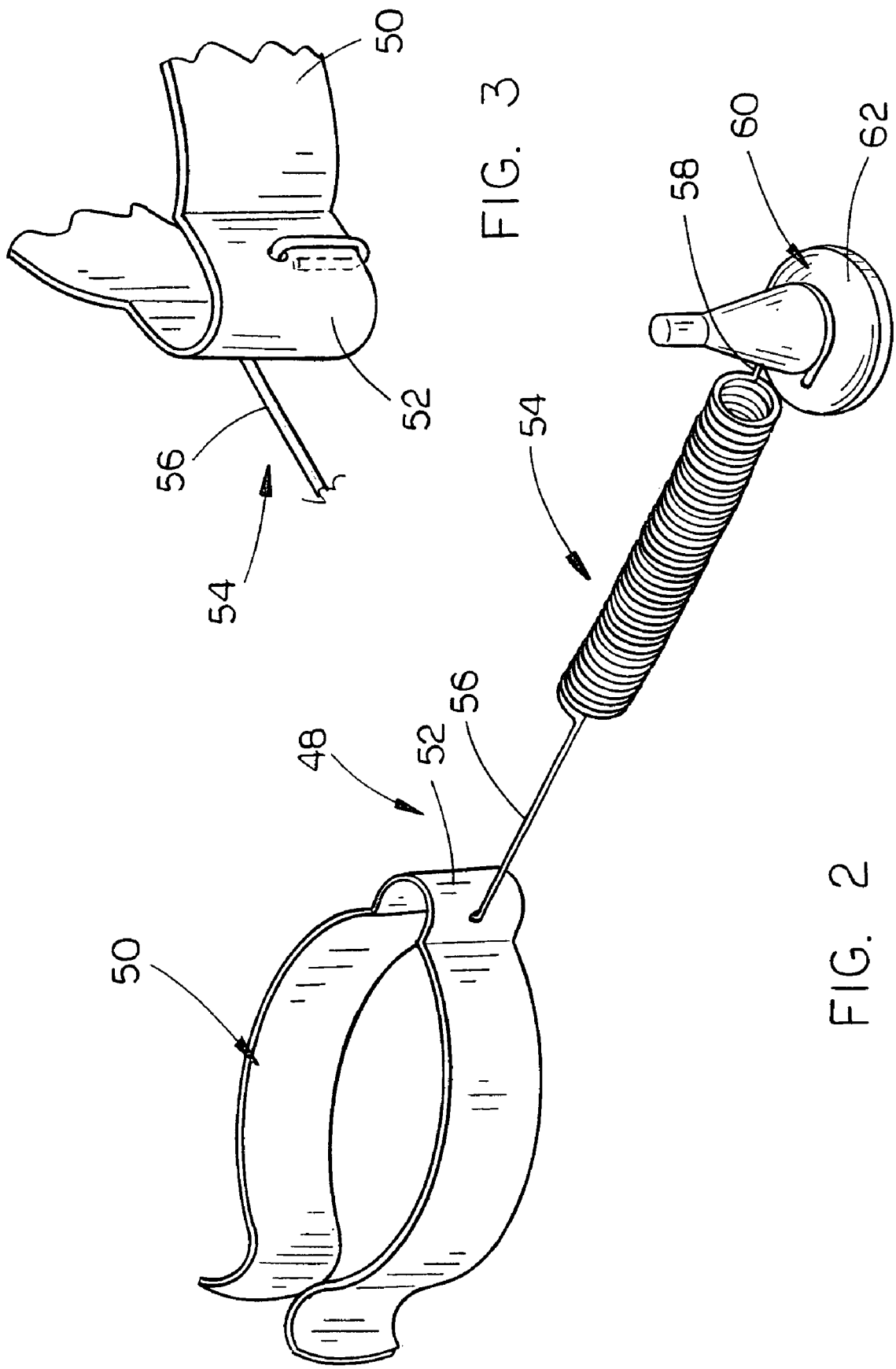

WATER SAVING DEVICE FOR A TOILET

BACKGROUND OF THE INVENTION

1. Field of the Invention

This invention relates to a water saving device for a toilet and more particularly to a water saving which may be installed in the toilet at the factory or which may be added to an existing toilet to conserve water during the flushing thereof.

2. Description of the Related Art

In the United States, approximately 40% of all domestic water consumed is flushed down the toilet. One person using a 5.5 gallon flush toilet will use 13,000 gallons of fresh water per year to dispose of 165 gallons of body waste. Since all water from the toilet goes directly into the sewer or septic tank, saving water used by toilets reduces both consumption and waste water flow.

One common approach to retrofitting older toilets to conserve water is to install a displacement device. Toilet displacement devices such as bricks or the like are used primarily on non-conserving toilets in order to reduce the volume of water used each time the toilet is flushed. This type of displacement device is simply placed into the tank in places where they do not interfere with the function of the flushing mechanism. The volume, which they occupy, will be saved each time the toilet is flushed.

SUMMARY OF THE INVENTION

A water saving device is described which is used in combination with a flush toilet system of conventional design. The conventional flush toilet system includes a water tank having a drain opening formed in the bottom thereof with a valve seat positioned in the drain opening. A fill valve assembly is positioned in the water tank and has an inlet connected to a source of water under pressure. A float is operatively connected to the fill valve assembly for controlling the operation thereof. A toilet bowl is provided below the water tank and is fluidly connected to the water tank by the drain opening and the valve seat. An overflow tube is also provided in the water tank and has an open upper end and a lower end which is in communication with the drain opening. A flapper valve is positioned in the water tank and is moveable between a lower closed position wherein it is in sealing engagement with the valve seat to an upper position wherein water in the water tank will drain into the toilet bowl. A flush handle is moveably mounted on the water tank and is operatively connected to the flapper valve for raising the flapper from its lower closed position.

The water saving device of this invention comprises a flapper valve limit structure which yieldably limits the upward movement of the flapper valve after it has been moved upwardly from its lower closed position towards its upper position thereby reducing the amount of water which will be discharged from the water tank into the toilet bowl during a flushing cycle. In the preferred embodiment, the flapper valve limit structure includes a clip which is mounted on the overflow tube and which has a spring attached thereto and extending therefrom. A flapper valve engagement member is secured to the outer end of the spring which is in the path of the flapper valve as it moves upwardly from its lower closed position towards its upper position. Preferably, the clip is selectively vertically moveably mounted on the overflow tube.

It is therefore a principal object of the invention to provide a water saving device for a toilet.

Still another object of the invention is to provide a water saving device for a toilet which may be either factory installed or which may be retrofitted into a water tank of the flush toilet system.

Still another object of the invention is to provide a water saving device for a toilet wherein a flapper valve limit structure is secured to the overflow tube in the water tank and which is in the path of the flapper valve to limit the amount of vertical movement of the flapper valve during a flush cycle.

These and other objects will be apparent to those skilled in the art.

BRIEF DESCRIPTION OF THE DRAWINGS

FIG. 2 is perspective view of the water saving device of this invention:

FIG. 3 is a partial enlarged perspective view of a portion of the device of FIG. 2:

DESCRIPTION OF THE PREFERRED EMBODIMENT

Figure 1:
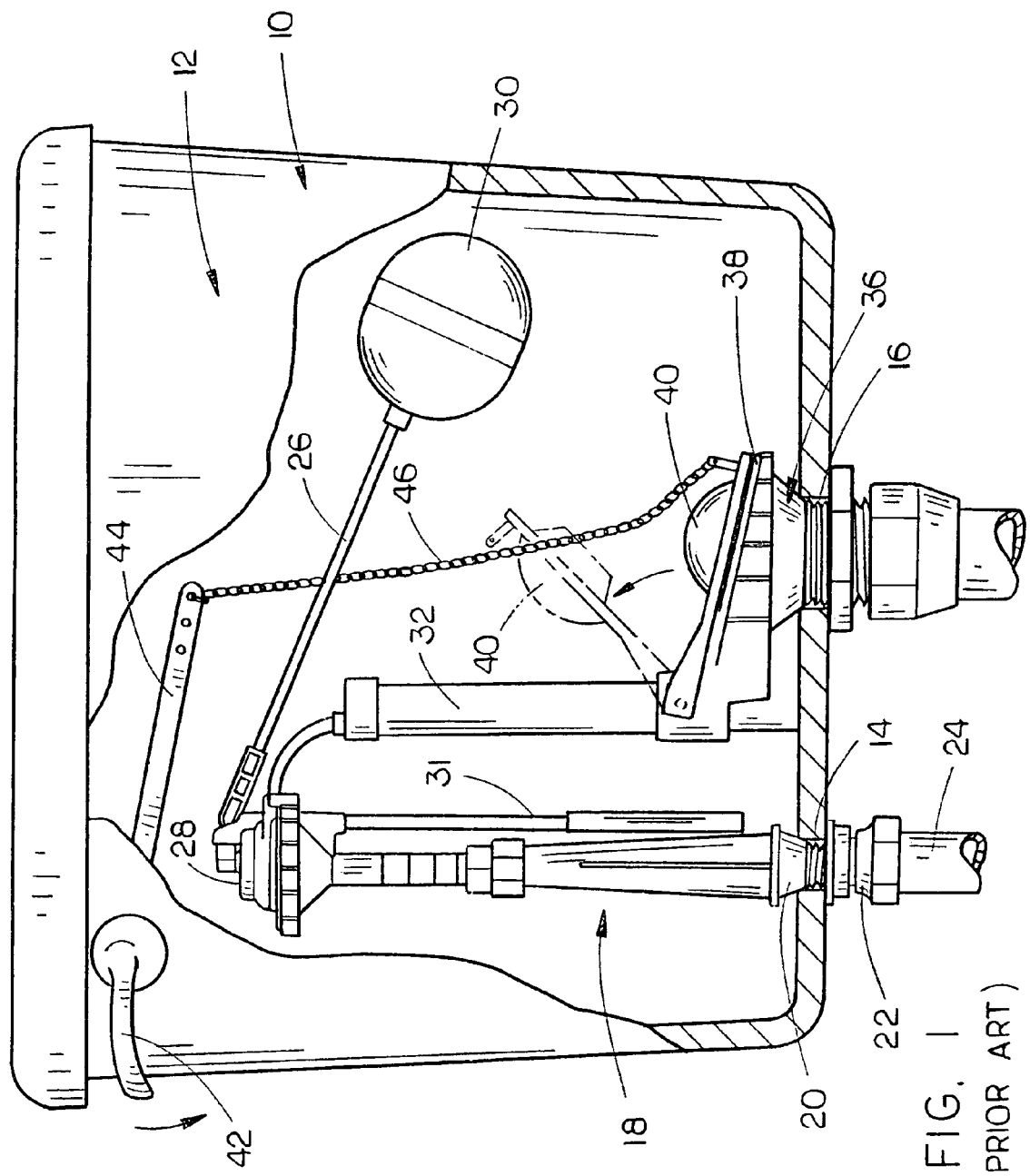
FIG. 1 is a front view of a conventional toilet tank of a toilet flush system with portions cut away to more fully illustrate the invention.

Referring to FIG. 1 which illustrates a conventional prior art toilet flushing system 10, the system 10 includes a water tank 12 having a water inlet 14 and a water drain opening 16 formed in the bottom thereof. An upstanding fill valve assembly 18 has its lower end 20 positioned in the inlet 14 and secured thereto by a lock nut and coupling assembly 22 for connection to a water inlet line 24. Float rod 26 is operatively connected to the valve assembly 28 and extends therefrom. Float ball 30 is secured to the outer end of rod 26 in conventional fashion. The fill valve assembly 18 includes a water fill line 31 which extends downwardly into the tank 12 from the discharge side of the valve assembly 28 for refilling the tank 12 after each flush. An overflow tube 32 is positioned in the tank 12 and has its lower end in communication with the toilet bowl. A refill tube 34 extends from the discharge side of the valve assembly 28 to the upper end of overflow tube 32 to refill the toilet bowl after each flush.

A drain fixture 36 is mounted in the drain opening 16 and includes an annular valve seat 38 at its upper end which is normally closed by a conventional flapper valve 40 which is pivotally secured to the overflow tube 32 in conventional fashion. When in its closed position, as illustrated in FIG. 1, flapper valve 40 closes the valve seat 38. When its open position, as illustrated by broken lines in FIG. 1, flapper valve 40 is unseated from valve seat 38 so that water in the tank 12 may pass through the drain fixture 36 into the toilet bowl to flush the same.

A conventional flush lever 42 is rotatably mounted on the tank 12 at the upper end thereof and has a conventional trip lever 44 connected thereto. Chain 46 extends from trip lever 44 to the flapper valve 40. When the flush lever 42 is in its normal non-flush position, as illustrated in FIG. 1, the chain 46 will be slack and flapper valve 40 will be closed. When flush lever 42 is pivotally moved downwardly from its non-flushing position, as illustrated by the arrow in FIG. 1, trip lever 44 will be moved upwardly which causes the chain 46 to lift flapper valve 40 out of sealing engagement with the valve seat 38. As the chain 46 lifts flapper valve 40 from its closed position, the buoyancy of the flapper valve 40 causes it to remain in its raised position until the water level in the tank 12 drops to a level where the flapper valve 40 is no longer floating in the water and it will drop downwardly, by gravity, to its lower seating position on the valve seat 38 of drain fixture 36. In the conventional toilet tank 12, substantially all the water in the tank 12 will be drained therefrom during each flush cycle. The instant invention permits a flushing cycle to occur with a reduced amount of water being drained from the tank 12 preventing water waste and reducing the amount of waste water being flushed into a septic tank or the like.

The water saving device of this invention is referred to generally by the reference numeral 48. Device 48 includes a spring clip or bracket 50 which is adapted to be selectively vertically adjustably mounted on the overflow tube 32. Clip 50 includes a semi-circular base portion 52 provided thereon. The numeral 54 refers to an elongated coil spring having ends 56 and 58. Although other types of springs may be utilized, it is preferred that the spring 54 be of the coil-type as illustrated in FIG. 2. End 56 of spring 54 is secured to the semi-circular portion 52 as illustrated in FIGS. 2 and 3 so that end 56 of spring 54 is rigidly attached to the semi-circular portion 52. End 58 of spring 54 is secured to a flapper valve engagement member 60 which is preferably constructed of a plastic or neoprene material. Preferably, the engagement member 60 includes a base portion 62.

Figure 4:
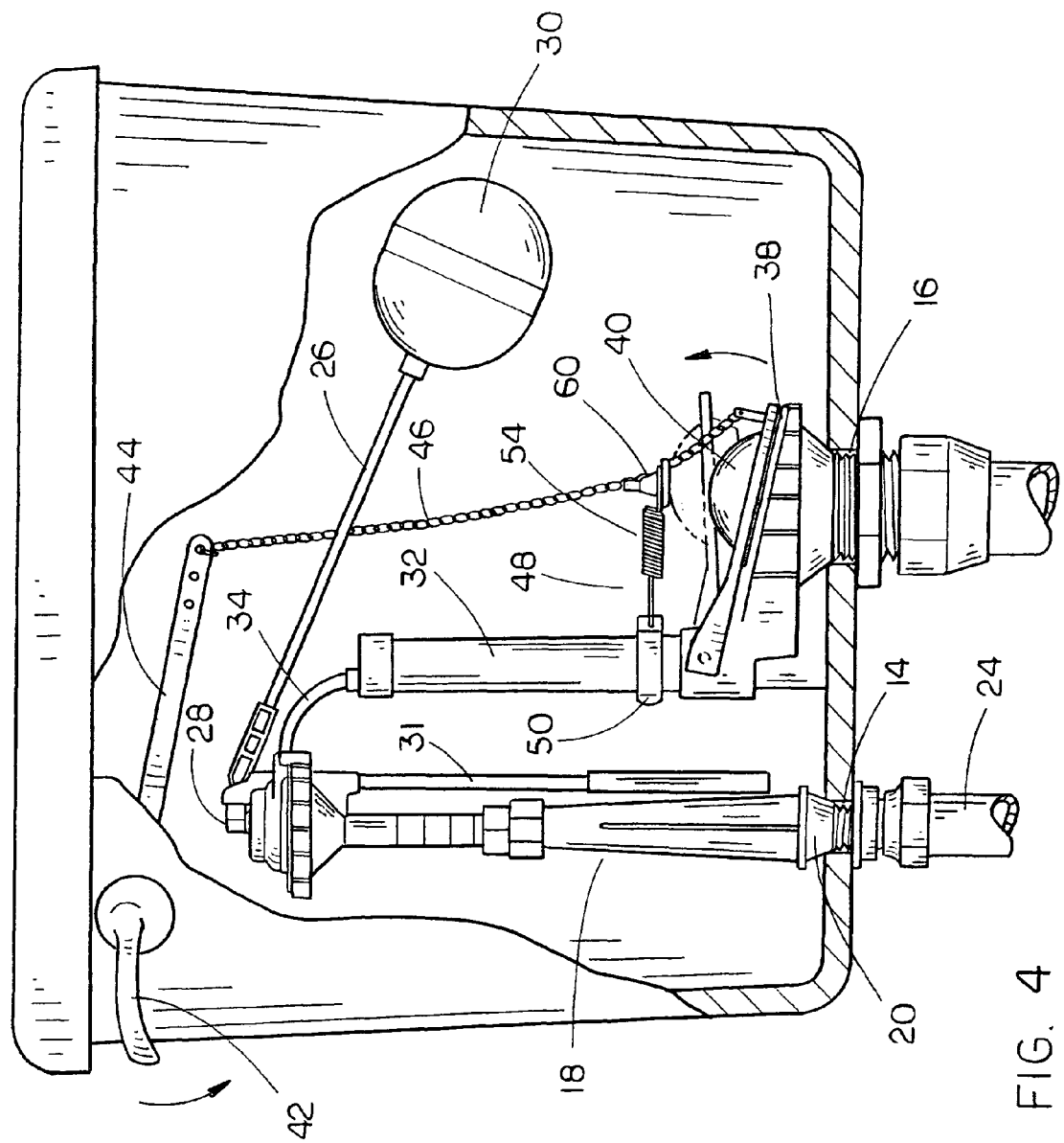
FIG. 4 is a view similar to FIG. 1 except that the water saving device of this invention has been mounted on the overflow tube.
Figure 5:
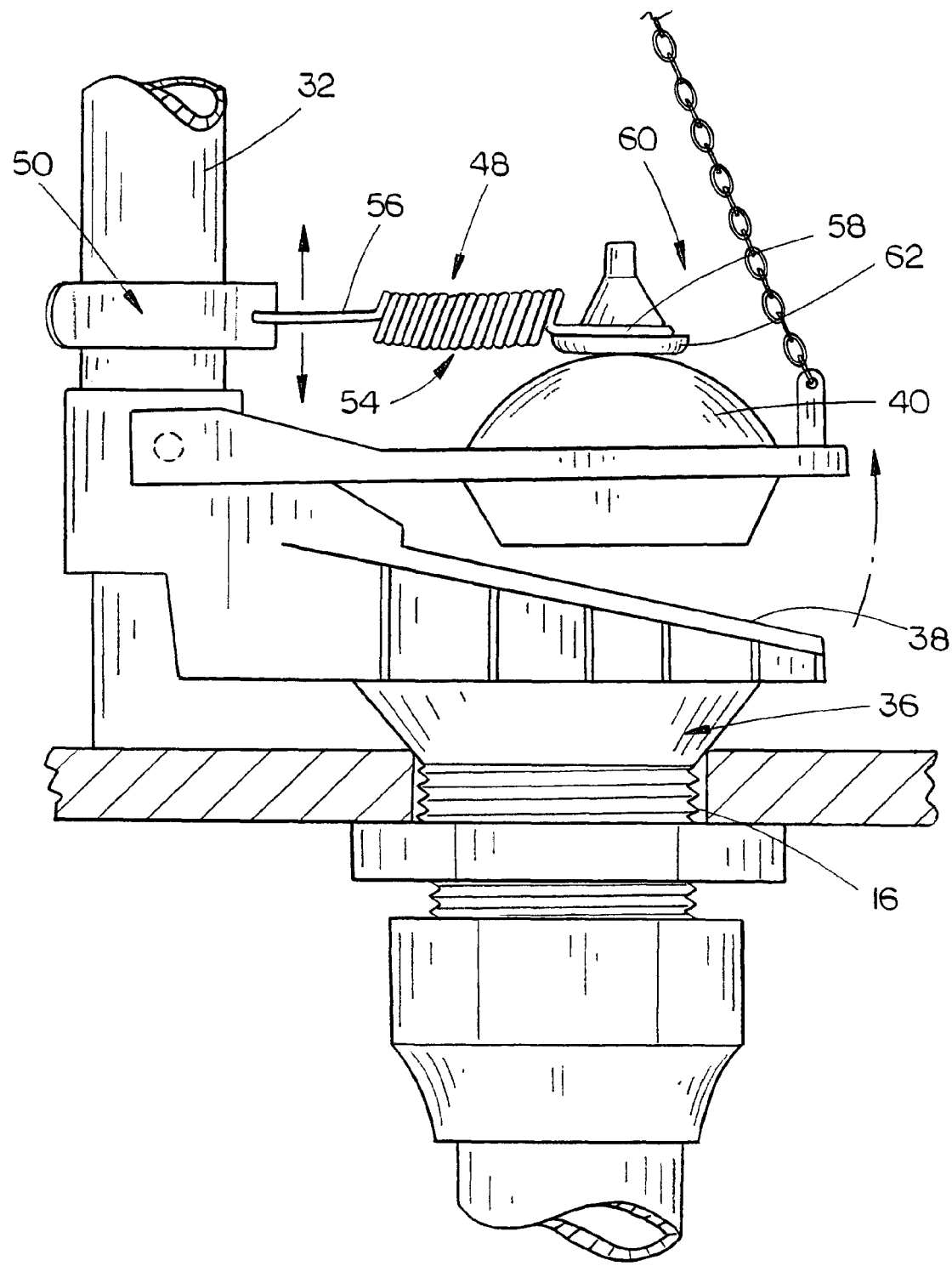
FIG. 5 is a side view of the water saving device of this invention mounted on the overflow tube of the toilet tank which illustrates the water saving device limiting the upward movement of the flapper valve.

In use, the clip or bracket 50 is vertically adjustably mounted on the overflow tube 32 so that the engagement member 60 is positioned above the flapper valve 40 and is in the pivotal path thereof as illustrated in FIGS. 4 and 5. The positioning of the device 48 relative to the overflow tube 32 is selected to control the amount of water which will be flushed from the tank 12 during each flush cycle.

Assuming that the flapper valve 40 is in its closed position, as illustrated in FIG. 4, the toilet is flushed as follows. The flush lever 42 is pivotally moved downwardly as indicated by the arrow in FIG. 4 which will cause the trip lever 44 to move upwardly so that the chain 46 will lift the flapper valve 40 from its sealing engagement with valve seat 38 and will move the flapper valve 40 upwardly from its lower closed position towards its upper position until the flapper valve 40 engages the engagement member 60 of the device 54 which will be sensed by the person who will hold the lever 42 downwardly till the person senses the engagement of the flapper valve 40 against the device 54 and will hold that position for a second or two during which time water will be draining from the tank 12 into the toilet bowl. The person will then release the lever 42 which will cause the flapper valve 40 to drop downwardly, by gravity, into sealing engagement with the valve seat 38.

Thus, it can be seen that the toilet may be flushed utilizing a limited amount of water due to the positioning and the yieldable resistance of the water saving device 48 being in the pivotal path of the flapper valve 40. If it is desired to more completely flush the water from the tank 12, the lever 42 will be depressed downwardly to its lower limit which will cause the flapper valve 40 to move the engagement member 60 of the device 54 upwardly from the broken line position of FIG. 4 which means that additional water will be flushed from the tank 12.

Thus it can be seen that a novel water saving device has been provided which may be retrofitted onto existing tanks of toilets or which may be factory installed. It can therefore be seen that a novel water saving device has been provided for a toilet flush system which accomplishes all of the stated objectives.

The invention claimed is:

1. In combination with a flush toilet system including:
   a. a water tank having a drain opening formed in the bottom thereof;
   b. a valve seat positioned in said drain opening;
   c. a fill valve assembly in said water tank having an inlet connected to a source of water under pressure;
   d. a float operatively connected to said fill valve assembly for controlling the operation thereof;
   e. a toilet bowl below said water tank fluidly connected to said water tank by said drain opening and said valve seat;
   f. an overflow tube in said water tank having an open upper end and a lower end which is in communication with said drain opening;
   g. a flapper valve which is movable between a lower closed position wherein it is in sealing engagement with said valve seat to an upper position wherein water in said water tank will drain into the toilet bowl;
   h. a flush handle movably mounted on said water tank and which is operatively connected to said flapper valve for raising said flapper valve from its said lower closed position; comprising,
   and a flapper valve limit structure which yieldably limits the upward movement of said flapper valve after it has been moved upwardly from its said lower closed position towards its said upper position thereby reducing the amount of water which will be discharged from said water tank into the toilet bowl during the flushing cycle;
   said flapper valve limit structure including a horizontally disposed generally U-shaped spring clip which is selectively vertically adjustably mounted on said overflow tube;
   said flapper valve limit structure also including a horizontally disposed, elongated coil spring having first and second ends;
   said first end of said coil spring being secured to said spring clip;
   said flapper valve limit structure including a flapper valve engagement member at the second end of the coil spring which is in the path of said flapper valve as it moves upwardly from its said lower closed position towards its said upper position.

* * * * *